United States Patent [19]

Wisdom

[11] Patent Number: 4,715,610
[45] Date of Patent: Dec. 29, 1987

[54] HITCH FOR A VEHICLE HAVING A SINGLE REAR WHEEL

[75] Inventor: James N. Wisdom, Beaver Dam, Wis.

[73] Assignee: Deere & Company, Moline, Ill.

[21] Appl. No.: 862,857

[22] Filed: May 13, 1986

[51] Int. Cl.⁴ ............................................. B60D 1/00
[52] U.S. Cl. ............................... 280/490 R; 172/396; 280/491 B; 280/496; 280/498
[58] Field of Search .......... 280/490 R, 491 R, 490 A, 280/491 B, 498, 495, 400, 460 R, 478 R, 489, 491 E, 472, 474, 481, 492, 496; 180/210, 211; 172/396, 450, 457

[56] References Cited

U.S. PATENT DOCUMENTS

| | | | |
|---|---|---|---|
| 1,636,276 | 7/1927 | Benjamin | 280/490 R |
| 2,378,504 | 6/1945 | Roos | 280/491 B |
| 2,503,096 | 4/1950 | Carlson | 280/490 R |
| 2,539,666 | 1/1951 | Jirsa | 280/490 R |
| 3,117,805 | 1/1964 | Schoeffler | 280/491 B |
| 3,891,239 | 6/1975 | Leo | 280/490 R |
| 3,910,355 | 10/1975 | Elfes | 172/450 |
| 4,563,019 | 1/1986 | Kuhn | 280/490 A |

FOREIGN PATENT DOCUMENTS

| | | | |
|---|---|---|---|
| 1216600 | 5/1966 | Fed. Rep. of Germany | 172/450 |
| 807068 | 1/1937 | France | 180/211 |

*Primary Examiner*—John J. Love
*Assistant Examiner*—Everett G. Diederiks, Jr.

[57] ABSTRACT

A self-storing hitch for a single rear wheeled vehicle including a generally C-shaped support having opposite ends pivotally attached to the vehicle frame on opposite sides of the single rear wheel. The support carries a hitch plate and is movable between a lowered towing position and a raised stored position. Spring pins lock the hitch in the selected position. In the towing position, the hitch plate extends horizontally rearward of the rear wheel. In the stored position, the rear section of the C-shaped support conforms generally to the contour of an upper rear section of the vehicle body.

4 Claims, 4 Drawing Figures

HITCH FOR A VEHICLE HAVING A SINGLE REAR WHEEL

TECHNICAL FIELD

This invention relates to hitches for drive vehicles, and more particularly to a self-storing hitch for a vehicle having a single rear wheel.

BACKGROUND ART

It is desirable to have a hitch on almost all field machines. In drive vehicles having a single rear steering wheel for zero turning radius or near zero turning radius, structure extending out from the rear or the machine can restrict the maneuvering of the vehicle or cause damage to obstacles while turning.

Those concerned with these and other problems recognize the need for an improved hitch for a vehicle having a single rear wheel.

DISCLOSURE OF THE INVENTION

The present invention provides a self-storing hitch for a single rear wheeled vehicle including a generally C-shaped support having opposite ends pivotally attached to the vehicle frame on opposite sides of the single rear wheel. The support carries a hitch plate and is movable between a lowered towing position and a raised stored position. Spring pins lock the hitch in the selected position. In the towing position, the hitch plate extends horizontally rearward of the rear wheel. In the stored position, the rear section of the C-shaped support conforms generally to the contour of an upper rear section of the vehicle body.

The hitch can be easily and conveniently lowered to the towing position when desired. When the vehicle is to be used in situations where a short turning radius is desired, the hitch is simply raised to the stored position and locked in place by spring pins.

An object of the present invention is the provision of an improved hitch for a single rear wheeled vehicle.

Another object is to provide a hitch for a single rear wheeled vehicle that is selectively movable between a towing position and a stored position.

A further object of the invention is the provision of a hitch for a rear wheeled vehicle that is inexpensive to manufacture.

Still another object is to provide a self-storing hitch for a rear wheeled vehicle that is easy to operate and maintain.

A still further object of the present invention is the provision of a hitch for a rear wheeled vehicle that does not restrict the use of the vehicle.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
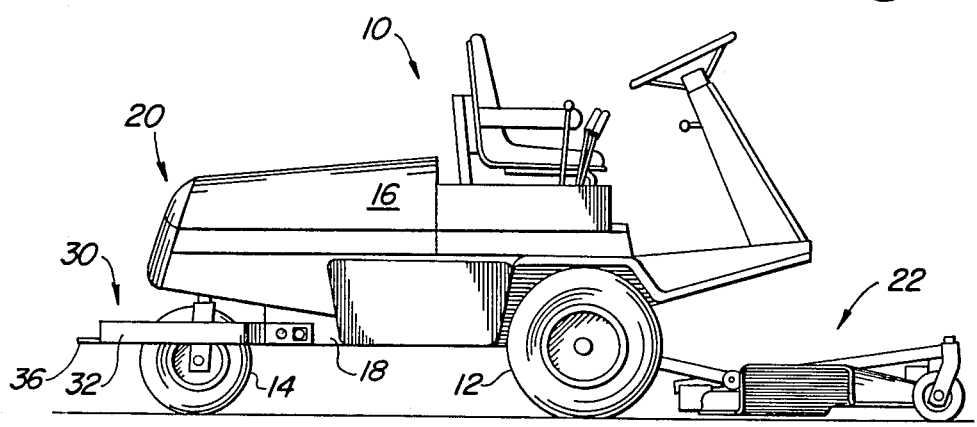
FIG. 1 is a side elevational view of a front mounted mower having a single rear wheel, and utilizing the self-storing hitch of the present invention.

Referring now to the drawings, wherein like reference numerals designate identical or corresponding parts throughout the several views, FIG. 1 shows a drive vehicle (10) supported by a pair of front drive wheels (12) and a single rear wheel (14). The vehicle body (16) is carried on the frame (18) and includes a contoured upper rear section (20). A mower (22) is operably attached forward of the drive vehicle (10). The single rear wheel (14) steers the vehicle (10) in a zero or near-zero turning radius.

The self-storing hitch (30) includes a generally C-shaped support (32) having opposite ends pivotally attached by pivot pins (34) to the frame (18). The central portion of the support (32) carries an outwardly extending hitch plate (36) and each end of the support (32) carries a locking spring pin (38).

Figure 4:
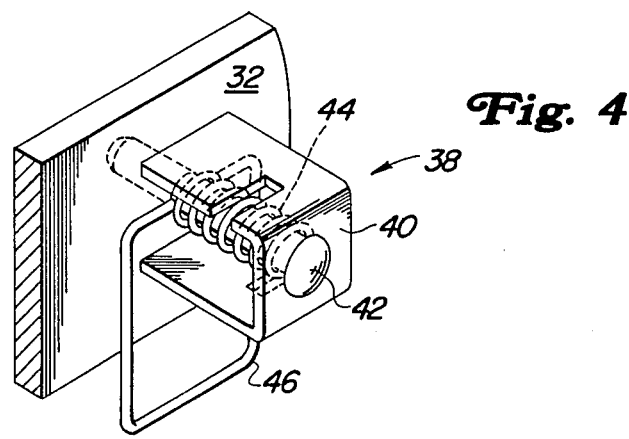
FIG. 4 is a greatly enlarged perspective view of one embodiment of a spring pin that may be used to lock the hitch in the selected position.

As shown in FIG. 4, each spring pin (38) includes a slotted bracket (40) and a pin (42) biased to an extended position by a spring (44). A handle (46) is received in an opening in the pin (42) and serves as a stop when it engages the support (32). To retract the pin (42), the handle (46) is pulled back. To lock the pin (42) in a retracted position, the handle (46) is rotated to engage the slots in the slotted bracket (40). It is to be understood that other spring pin embodiments could be used in combination with the hitch (30).

Figure 2:
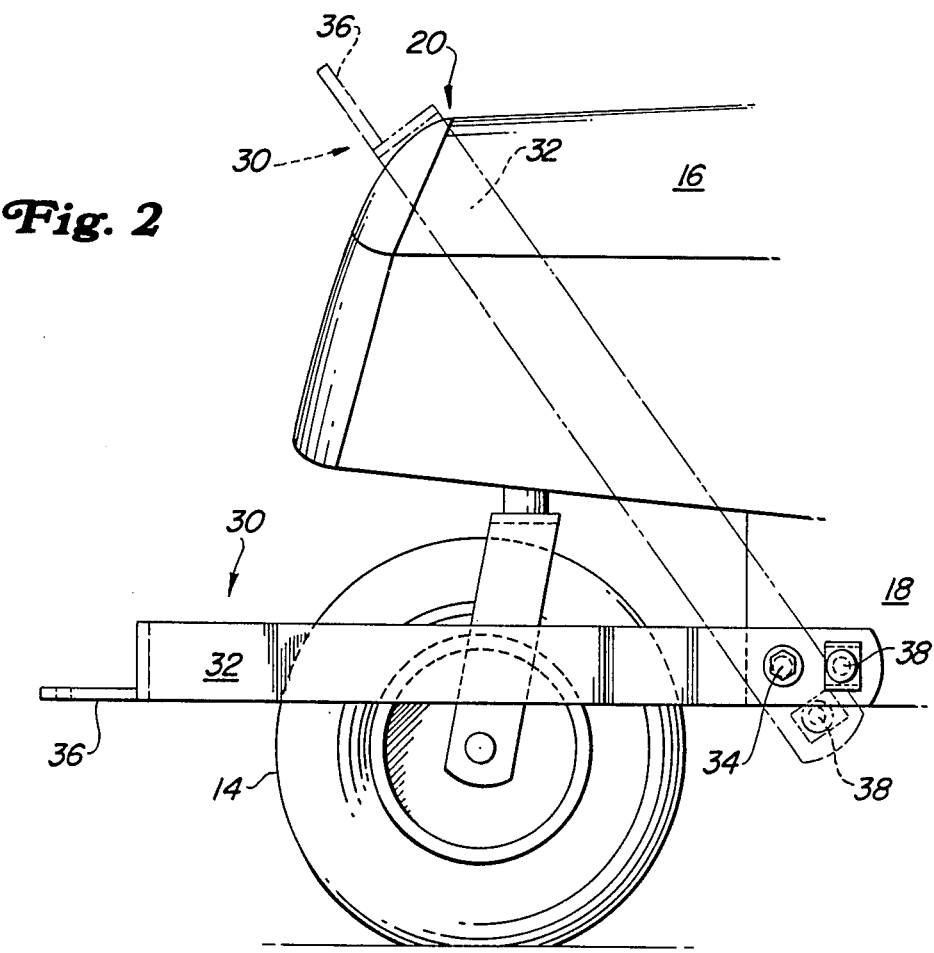
FIG. 2 is an enlarged side elevational view showing in full lines the hitch in the lowered towing position, and illustrating in dashed lines the hitch in the raised stored position.
Figure 3:
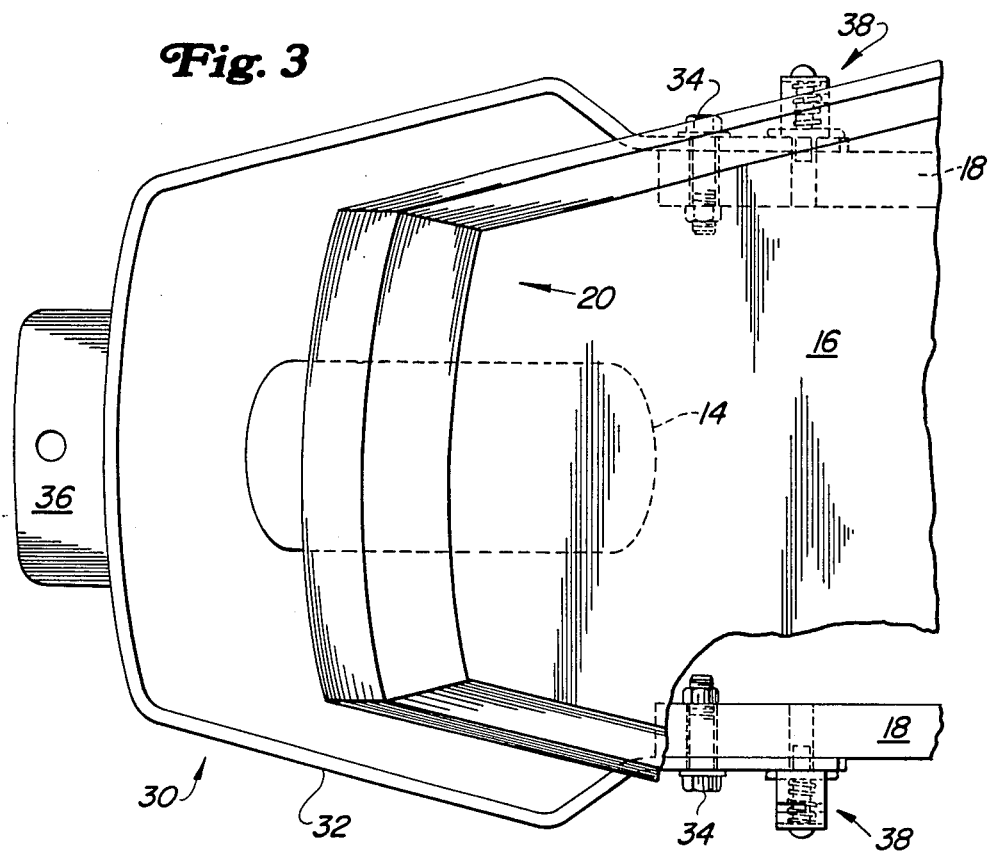
FIG. 3 is an enlarged top plan view showing the hitch in the towing position.

As best shown in FIGS. 2 and 3, the hitch (30) is pivotally movable between a horizontally disposed towing position and a raised stored position. In the towing position, the pins (42) engage an opening in the frame (18) and lock the support (32) in position. In the stored position, the pins (42) engage the underside of the frame (18) and the support (32) is prevented from lowering. When in the stored position, the inside of the rear section of the support (32) conforms generally to the upper rear section (20) of the vehicle body (16).

To raise the hitch (30) from the towing position to the stored position, the pins (42) are retracted from the openings in the frame (18) and the support (32) is rotated upwardly about pivot pins (34). When the support (32) reaches the raised position, the pins (42) snap into engagement with the underside of the frame (18) to lock the hitch (30) in the raised position. To lower the hitch (30), the pins (42) are retracted and the support (32) is lowered until the pins (42) snap into engagement with the openings in the frame (18) to lock the hitch (30) in the towing position.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In a hitch on a vehicle having a single rear wheel, said vehicle including a frame extending outwardly from both sides of said rear wheel and a rear body section having side portions, a rear portion, and a top portion including a contoured upper rear section; said rear body section being supported on said frame and extending vertically above said rear wheel, the improvement comprising:

- a generally C-shaped support having opposite ends pivotally attached to said frame on opposite sides of said rear wheel, said support being attached forwardly of said rear wheel and being selectively movable between a lowered towing position and a raised stored position wherein said support encircles said side portions and said rear portion adjacent said contoured upper rear section of said rear body section above said rear wheel;
- a hitch plate attached to and extending out from the central portion of said support; and
- means for selectively locking said support against pivotal movement in said towing and stored positions.

2. The hitch of claim 1 wherein said selective locking means includes a spring pin.

3. The hitch of claim 1 wherein said support is disposed to conform to the contoured upper rear section when said support is in the stored position, thereby enhancing the maneuverability of the vehicle when operating near obstructions.

4. A hitch for a vehicle steered by a single rear wheel, said vehicle having a frame and a body supported thereon, said body including a rear body section having side portions, a rear portion, and a top portion including a contoured upper rear section, said hitch comprising:

- a support having hitch means operatively connected thereto and opposite ends pivotably attached to said frame on opposite sides of said wheel, said support being selectively movable between a lowered towing position and a raised stored position wherein said support encircles said side portions and said rear portion adjacent said contoured upper rear section of said rear body section; said support being shaped to conform to said contoured upper rear section such that when said support is in said stored position, said vehicle has essentially the same maneuverability as if said support were removed from said vehicle; and
- means for selectively locking said support in said stored position.

* * * * *